United States Patent
Ko et al.

(10) Patent No.: US 10,225,294 B2
(45) Date of Patent: Mar. 5, 2019

(54) METHOD OF DISPLAYING USER INFORMATION OF MISSION CRITICAL PUSH TO TALK (MCPTT) GROUP PERFORMING OFF-NETWORK MCPTT SERVICE

(71) Applicant: SAMSUNG ELECTRONICS CO., LTD., Suwon-si (KR)

(72) Inventors: Jun-hyuk Ko, Suwon-si (KR); Min-suk Ko, Seoul (KR); Bo-ra Hyun, Hwaseong-si (KR); Jae-sang Lim, Suwon-si (KR); Jin-su Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/798,606

(22) Filed: Oct. 31, 2017

(65) Prior Publication Data

US 2018/0131734 A1 May 10, 2018

(30) Foreign Application Priority Data

Nov. 4, 2016 (KR) .................. 10-2016-0146917
Apr. 14, 2017 (KR) .................. 10-2017-0048531

(51) Int. Cl.
*H04L 29/06* (2006.01)
*H04W 4/10* (2009.01)
*H04W 4/08* (2009.01)
*H04W 76/45* (2018.01)

(52) U.S. Cl.
CPC ...... *H04L 65/4061* (2013.01); *H04L 65/4038* (2013.01); *H04L 65/4046* (2013.01); *H04L 65/608* (2013.01); *H04W 4/10* (2013.01); *H04W 4/08* (2013.01); *H04W 76/45* (2018.02)

(58) Field of Classification Search
CPC ........ H04W 4/08; H04W 4/10; H04W 76/45; H04L 65/608; H04L 65/4038; H04L 65/4046; H04L 65/4061
See application file for complete search history.

(56) References Cited

U.S. PATENT DOCUMENTS 7,778,655 B2 8/2010 Huh et al.
7,809,391 B2 10/2010 Kwon
7,826,872 B2 11/2010 Ekberg
(Continued)

FOREIGN PATENT DOCUMENTS

JP 200768078 A 3/2007
KR 100652655 A 12/2006
(Continued)

*Primary Examiner* — Raymond S Dean
(74) *Attorney, Agent, or Firm* — Sughrue Mion, PLLC

(57) ABSTRACT

A method of displaying user information of a group including a plurality of terminals, the plurality of terminals including a first terminal manager a floor and a second terminal, the method including transmitting a floor grant message from the first terminal to the plurality of terminals, wherein the floor grant message indicates the second terminal as a transfer target of the floor; acquiring floor candidate information of the second terminal by using a floor request queue; receiving a real-time transport protocol media packet within a predetermined time; determining whether the RTP media packet is from the second terminal; and displaying second terminal user information using the floor candidate information based on a result of the determining.

19 Claims, 11 Drawing Sheets

(56) References Cited

U.S. PATENT DOCUMENTS

| | | |
|---|---|---|
| 7,965,659 B1 | 6/2011 | Doran |
| 9,077,809 B2 | 7/2015 | Osanai |
| 2009/0156246 A1 | 6/2009 | Toba |
| 2010/0048235 A1 | 2/2010 | Dai et al. |

FOREIGN PATENT DOCUMENTS

| | | |
|---|---|---|
| KR | 100819494 B1 | 4/2008 |
| KR | 1020090058227 A | 6/2009 |
| KR | 101104704 A | 1/2012 |

FIG. 7B

FGM Format

```
 0                   1                   2                   3
 0 1 2 3 4 5 6 7 8 9 0 1 2 3 4 5 6 7 8 9 0 1 2 3 4 5 6 7 8 9 0 1
```

| V=2 | P | SUBTYPE | PT=APP=204 | LENGTH |
|---|---|---|---|---|
| SSRC OF FLOOR CONTROL SERVER ||||
| USER ID FIELD ||||
| GRANTED PARTY'S IDENTITY FIELD ||||

TABLE

| MESSAGE NAME | SUBTYPE | REFERENCE | DIRECTION |
|---|---|---|---|
| FLOOR REQUEST | 00000 | SUBCLAUSE 8.2.4 | CLIENT → SERVER |
| FLOOR GRANTED | x0001 | SUBCLAUSE 8.2.5 | SERVER → CLIENT |
| FLOOR DENY | x0011 | SUBCLAUSE 8.2.6 | SERVER → CLIENT |
| FLOOR RELEASE | x0100 | SUBCLAUSE 8.2.7 | CLIENT → SERVER |
| FLOOR IDLE | x0101 | SUBCLAUSE 8.2.8 | SERVER → CLIENT |
| FLOOR TAKEN | x0010 | SUBCLAUSE 8.2.9 | SERVER → CLIENT |
| FLOOR REVOKE | 00110 | SUBCLAUSE 8.2.10 | SERVER → CLIENT |
| FLOOR QUEUE POSITION REQUEST | 01000 | SUBCLAUSE 8.2.11 | CLIENT → SERVER |
| FLOOR QUEUE POSITION INFO | x1001 | SUBCLAUSE 8.2.12 | SERVER → CLIENT |
| FLOOR ACK | 01010 | SUBCLAUSE 8.2.13 | SERVER → CLIENT<br>CLIENT → SERVER |
| FLOOR ARBITRATOR USER ID REQUEST | 01100 | SUBCLAUSE 8.2.xx | CLIENT → SERVER |
| FLOOR ARBITRATOR USER ID INFO | x1101 | SUBCLAUSE 8.2.xx | SERVER → CLIENT |
| NOTE: THE FLOOR CONTROL SERVER IS THE SERVER AND THE FLOOR PARTICIPANT IS THE CLIENT. | | | |

FAUIR → FLOOR ARBITRATOR USER ID REQUEST
FAUI → FLOOR ARBITRATOR USER ID INFO
NEW

FIG. 9B

FORMAT_1

```
 0                   1                   2                   3
 0 1 2 3 4 5 6 7 8 9 0 1 2 3 4 5 6 7 8 9 0 1 2 3 4 5 6 7 8 9 0 1
```

| V=2 | P | SUBTYPE | PT=APP=204 | LENGTH |
|---|---|---|---|---|
| SSRC OF FLOOR CONTROL SERVER ||||
| NAME=MCPT ||||

FIG. 9C

FORMAT_2

```
 0                   1                   2                   3
 0 1 2 3 4 5 6 7 8 9 0 1 2 3 4 5 6 7 8 9 0 1 2 3 4 5 6 7 8 9 0 1
```

| V=2 | P | SUBTYPE | PT=APP=204 | LENGTH |
|---|---|---|---|---|
| SSRC OF FLOOR CONTROL SERVER ||||
| NAME=MCPT ||||
| USER ID FIELD ||||

METHOD OF DISPLAYING USER INFORMATION OF MISSION CRITICAL PUSH TO TALK (MCPTT) GROUP PERFORMING OFF-NETWORK MCPTT SERVICE

CROSS-REFERENCE TO RELATED APPLICATIONS

This application claims priority from Korean Patent Application Nos. 10-2016-0146917, filed on Nov. 4, 2016, and 10-2017-0048531, filed on Apr. 14, 2017, in the Korean Intellectual Property Office, the disclosures of which are incorporated herein by reference in their entireties.

BACKGROUND

Methods and apparatuses consistent with example embodiments relate to a mission critical push to talk (MCPTT) service, and more particularly, to a method of displaying user information of an MCPTT group that performs an off-network MCPTT service.

A communication service such as a push to talk (PTT) service provides a method to allow two or more users to engage in communication. Users may request permission to transmit a communication (e.g., traditionally by pressing a button). An enhanced critical communication service is referred to as mission critical push to talk (MCPTT) over Long-Term Evolution (LTE). MCPTT is suitable for mission-critical scenarios and supports advanced PTT services based on 3GPP evolved packet system (EPS) services.

MCPTT is primarily targeted at providing critical communications services for organizations involved in public safety, transportation, public utilities, industrial, or nuclear power plant operations. In addition, with regard to public disaster safety communications, 3GPP Release-13 has been standardized on MCPTT and isolated E-UTRAN operation mode.

SUMMARY

One or more example embodiments provide a method of displaying user information of a mission critical push to talk (MCPTT) group that performs an off-network MCPTT service.

According to an aspect of an example embodiment, there is provided a method of displaying user information of a group including a plurality of terminals, the plurality of terminals including a first terminal managing a floor and a second terminal, the method including: transmitting a floor grant message from the first terminal to the plurality of terminals, wherein the floor grant message indicates the second terminal as a transfer target of the floor; acquiring a floor candidate information of the second terminal by using a floor request queue; receiving a real-time transport protocol media packet within a predetermined time; determining whether the real-time transport protocol media packet is from the second terminal; and displaying second terminal user information by using the floor candidate information based on a result of the determining.

According to an aspect of another example embodiment, there is provided a method of displaying user information of a group including a first terminal managing a floor and a second terminal, the method including: receiving, by the second terminal, a floor grant message including first terminal user information while the first terminal is in a floor pending state; and displaying, by the second terminal, the first terminal user information based on the floor grant message.

According to an aspect of yet another example embodiment, there is provided a terminal configured to manage a floor and display user information of a group including a plurality of terminals the terminal including: a display; a communicator; and a processor configured to cause the communicator to transmit a floor grant message to the plurality of terminals, the floor grant message indicating a target terminal among the plurality of terminals; acquire a floor candidate information of the target terminal from a floor request queue; determine whether a real-time transport protocol media packet received via the communicator is from the target terminal; and cause the display to display target terminal user information by using the floor candidate information based on the real-time transport protocol media packet being received from the target terminal within a predetermined time.

BRIEF DESCRIPTION OF THE DRAWINGS

Example embodiments will be more clearly understood from the following detailed description taken in conjunction with the accompanying drawings in which:

FIG. 7B is a diagram showing a format of a floor grant message according to an example embodiment;

FIG. 9A is a table showing a type of a floor arbitrator user ID request message and a floor control message to which a floor arbitrator user ID message is added according to an example embodiment;

FIG. 9B is a diagram showing a format of a floor arbitrator user ID request message according to an example embodiment;

FIG. 9C is a diagram showing a format of a floor arbitrator user ID message according to an example embodiment.

DETAILED DESCRIPTION

Hereinafter, example embodiments will be explained in detail with reference to the accompanying drawings.

Figure 1:
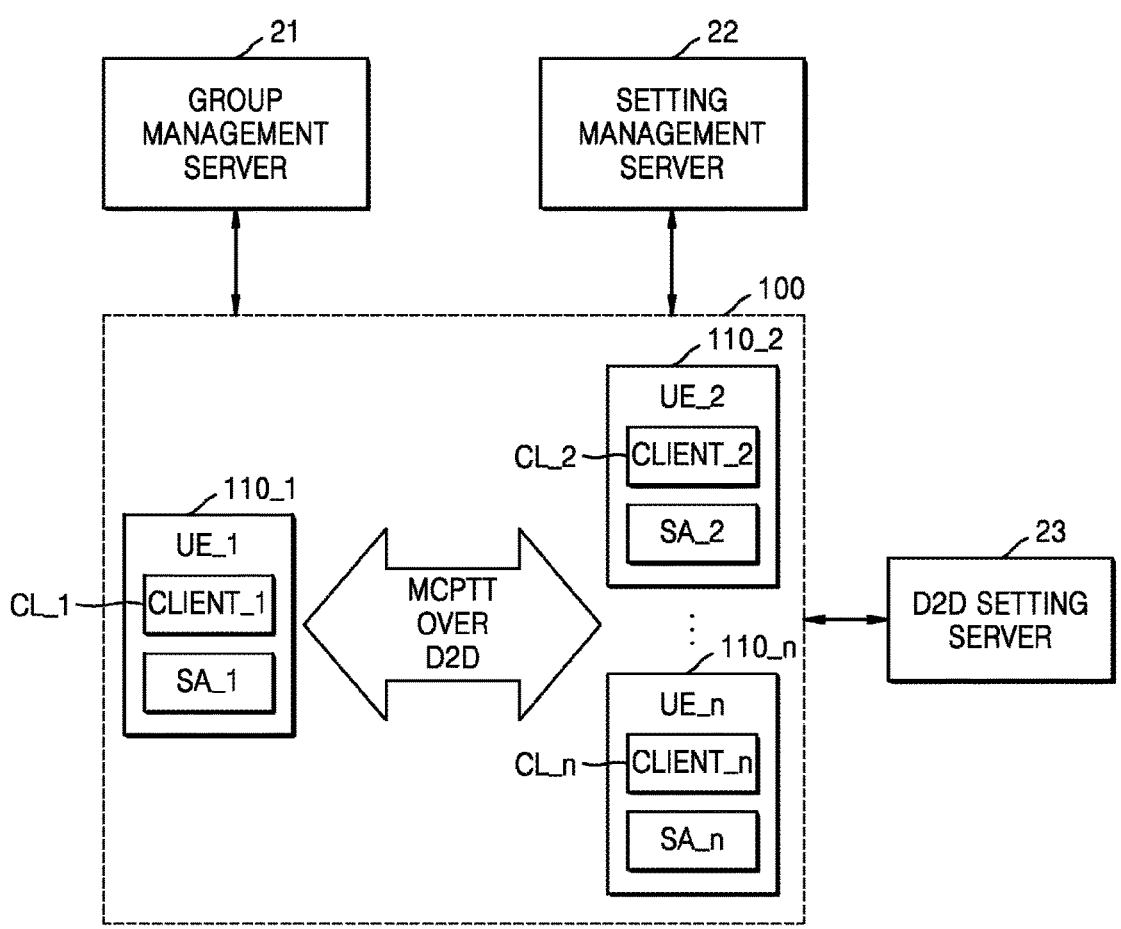
FIG. 1 is a schematic block diagram showing a mission critical push to talk (MCPTT) service system according to an example embodiment.

FIG. 1 is a schematic block diagram showing a mission critical push to talk (MCPTT) service system 10 according to an example embodiment.

Referring to FIG. 1, the MCPTT service system 10 may include a group management server 21, a setting management server 22, a Device-to-Device (D2D) configuration server 23, and an MCPTT group 100. The MCPTT group 100 may include a plurality of terminals 110_1 to 110_n for performing an MCPTT service. The terminals 110_1 to 110_n may be referred to as pieces of user equipment (UE). The MCPTT group 100 may support an off-network MCPTT service in to users who are in a situation where a communication network infrastructure, such as a base station, is destroyed or a communication infrastructure does not exist.

The plurality of terminals 110_1 to 110_n may access the group management server 21 and the setting management server 22 through a predetermined communication network so as to perform the MCPTT service and receive MCPTT off-network related setting information. For example, the plurality of terminals 110_1 to 110_n may access the group management server 21 and the setting management server 22 by using Long-Term Evolution (LTE), Wireless Fidelity (WiFi), Bluetooth, etc. The MCPTT off-network related setting information may include group setting information which is information necessary for a D2D (Device to Device) communication according to a predetermined frequency and connection of an off-network group call without being controlled by the mobile communication infrastructure.

The group setting information may include group management information, user profile information, and service control information. The group management information may include a group ID indicating each unique group, group members included in each group, a floor priority between the group members, a multicast address, and an ID used in D2D communication.

The ID used in the D2D communication may refer to a ProSe Layer-2 Group ID on a ProSe Layer. The group members may refer to each of the terminals 100_1 to 100_n included in the MCPTT group 100 or a user of each of the terminals 100_1 to 100_n. The user profile information may include an MCPTT ID assigned to each of the terminals 100_1 to 100_n and group list information on which the MCPTT service is allowed in the off-network. The MCPTT ID may correspond to user information of a terminal. The service control information may include a call considering an MCPTT distributed control environment of the off-network and a floor request related time limit information. Also, the plurality of terminals 100_1 to 100_n may receive setting information and permission information, such as frequency information, geographical information, and the like, which may be used for D2D communication, from the D2D setting server 23.

In an example embodiment, the MCPTT group 100 may be a group in which an off-network MCPTT service is allowed and may be assigned with a unique ProSe Layer-2 group ID. Each of a plurality of terminals 110_1 to 110_n included in the MCPTT group 100 may be assigned with a unique MCPTT ID. The plurality of terminals 110_1 to 110_n may be referred to as group call participants. The plurality of terminals 110_1 to 110_n may transmit and receive a floor control message and a Real Time Transport Protocol (RTP) media packet using the ProSe Layer-2 group ID and the multicast address, thereby performing the MCPTT service off-network.

Hereinafter, operations of transmitting and receiving a predetermined floor control message and an RTP media packet in order for the plurality of terminals 110_1 to 110_n to perform the MCPTT service may be performed under the assumption that the ProSe Layer-2 group ID and the multicast address allocated to the MCPTT group 100 are used.

The terminals 100_1 to 100_n according to an example embodiment may respectively execute clients CL_1 to CL_n and perform the MCPTT service through the clients CL_1 to CL_n. Hereinafter, it will be described that each of the clients CL_1 to CL_n performs the MCPTT service. In addition, the terminals 100_1 to 100_n may respectively include storage areas SA_1 to SA_n in which a plurality of pieces of information necessary for performing the MCPTT service are stored.

In an example embodiment, the first terminal 110_1 may be a floor control terminal that manages the current floor. When at least one of the other terminals 110_2 to 110_n transmits a floor request message while the first terminal 110_1 is talking (for example, when the first terminal 110_1 is transmitting the RTP media packet), the first terminal 110_1 may store user information (for example, the MCPTT ID) about a terminal requesting the floor in a floor request queue in an order of requests received after the first terminal 110_1 has ended transmitting the RTP media packet. Thus, the floor request queue may store floor transfer related information. The floor transfer related information may include the user information about the terminal requesting the floor. In addition, a predetermined storage area SA_1 of the first terminal 110_1 may include the floor request queue.

Thereafter, the first terminal 110_1 may select a terminal to which the floor is to be transferred by referring to the floor request queue and may transmit a floor grant message to the terminals 110_2 to 110_n in the MCPTT group 100. In an example embodiment, assuming that the second terminal 110_2 is the terminal to which the floor is transferred, the first terminal 110_1 may obtain user information about the second terminal 110_2 from the floor request queue as floor candidate information and separately store the floor candidate information in the storage area SA_1. A floor control message such as a floor request message, a floor grant message, and the like may be transmitted and received based on an RTCP (RTP control protocol) for real-time processing.

When the floor is transferred to the second terminal 110_2, the first terminal 110_1 may display user information about the second terminal 110_2 using the floor candidate information. That is, the first terminal 110_1 may display the user information about the second terminal 110_2 to which floor has been transferred so that a user of the first terminal 110_1 may view the user information using a user interface included in the first terminal 110_1. Thus, the user of the first terminal 110_1 may know the floor, a terminal currently talking, or a user of the terminal.

In an example embodiment, the first terminal 110_1 may be in a floor pending state ('O: pending granted') as a floor control terminal having a floor and may transmit a floor grant message to the terminals 110_2 to 110_n included in the MCPTT group 100. The floor granting message may include user information about a terminal that is a floor transfer object and user information about a terminal that has talked so far, i.e., the terminal that has transferred the floor.

For example, if it is assumed that the floor transfer object is the second terminal 110_2, the third terminal 110_3 may receive the floor grant message and display user information about the second terminal 110_2 that is the floor transfer object and user information about the first terminal 110_1 that has transferred the floor by using the floor grant message. Thus, a user of the third terminal 110_3 may know the second terminal 110_2 that has received the floor and has the floor and the first terminal 110_1 that has transferred the floor.

In an example embodiment, the nth terminal 110_n may transmit a floor arbitrator information request message to the terminals 110_1 to 110_n -1 in the MCPTT group 100 in order to request user information about a terminal that is talking. Assuming that the first terminal 110_1 is a floor control terminal having the current floor (or a floor arbitration terminal), the first terminal 110_1 may transmit a floor arbitrator information message including user information (or floor arbitrator information) about the first terminal 110_1 to the terminals 110_2 to 110_n in the MCPTT group 100 in response to the floor arbitrator information request message. The nth terminal 110_n may display the user information about the first terminal 110_1 which is the floor control terminal, using the floor arbitrator information message.

The MCPTT group 100 according to an example embodiment may display user information about a terminal that is talking or has talked in the past using the MCPTT service through a user interface of each terminal, and thus a user may recognize a terminal that starts or ends talking, thereby increasing usability of the MCPTT service.

Figure 2:
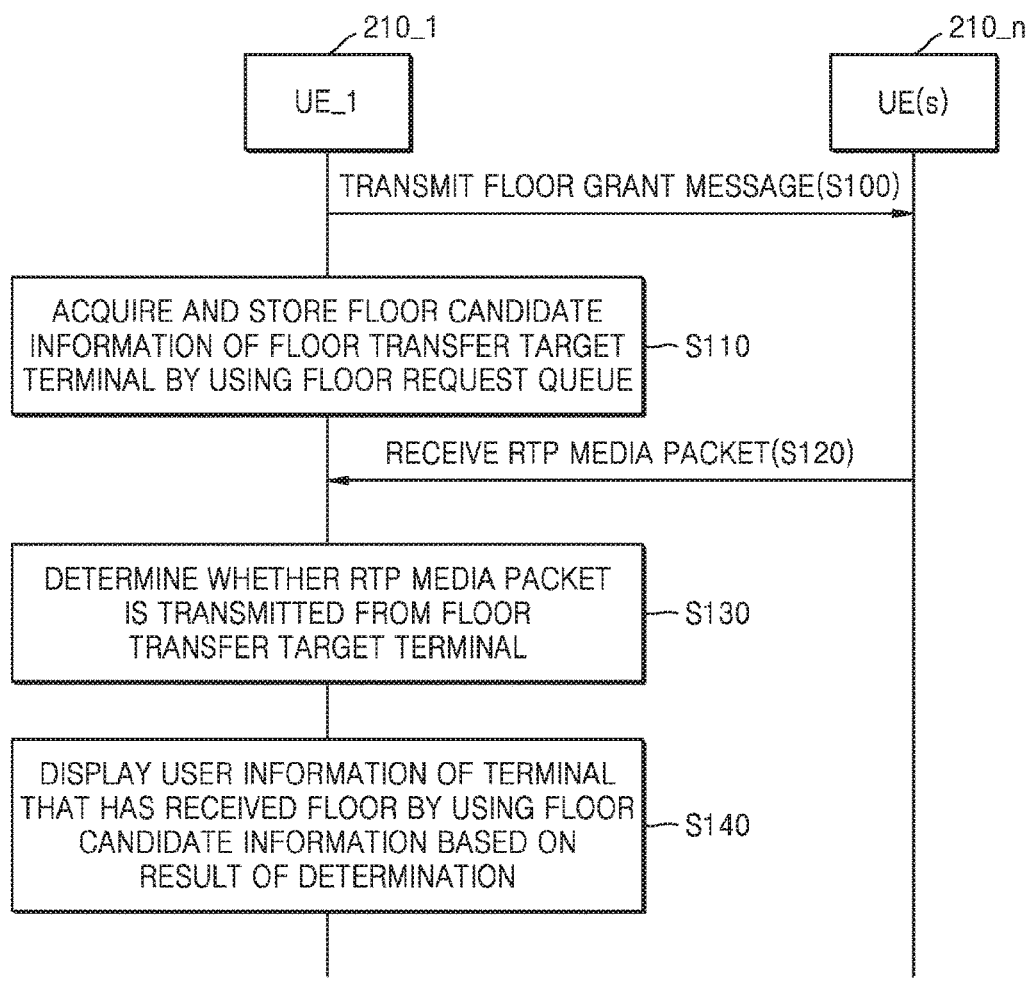
FIG. 2 is a flowchart illustrating a method of displaying user information of terminals for performing an MCPTT service according to an example embodiment.

FIG. 2 is a flowchart illustrating a method of displaying user information of terminals for performing an MCPTT service according to an example embodiment.

Referring to FIG. 2, a first terminal 210_1, as a floor control terminal, may transmit a floor grant message to other terminals UE(s) in the same MCPTT group as the first terminal 210_1 (S100). The first terminal 210_1 may store (or queue) user information for a terminal requesting the floor in a floor request queue when the other terminals UE(s) transmit a floor request message. The order of requests in the floor request queue may be based on an order in which the floor request messages are received. The first terminal 210_1 may obtain floor candidate information for a floor transfer target terminal using the floor request queue and store the floor candidate information in a separate storage area (S110). The first terminal 210_1 may receive an RTP media packet (S120). The first terminal 210_1 may determine whether the RTP media packet has been transmitted from the floor transfer target terminal (S130). The first terminal 210_1 may display user information about a terminal that has received the floor using the floor candidate information based on a result of determination (S140).

In an example embodiment, when the RTP media packet is transmitted from the floor transfer target terminal, the first terminal 210_1 may display user information about a terminal that has obtained a current floor to a user of the first terminal 210_1. However, when the RTP media packet is not transmitted from the floor transfer target terminal, the first terminal 210_1 may display nothing to the user of the first terminal 210_1.

Figure 3:
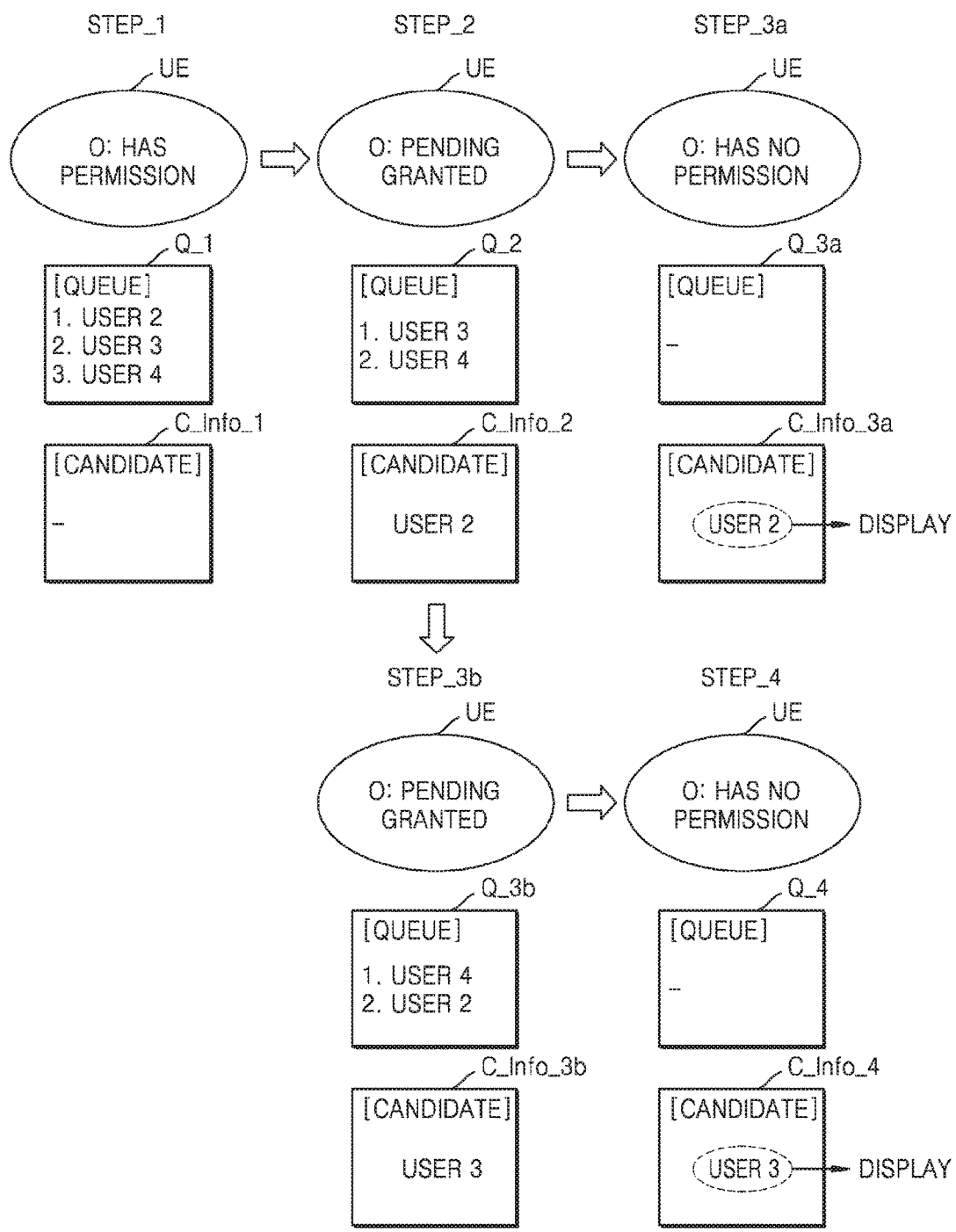
FIG. 3 is a diagram for explaining a method of displaying a floor related state of a terminal controlling floor and user information with respect to the floor related state according to an example embodiment.

FIG. 3 is a diagram for explaining a method of displaying a floor related state of a terminal controlling floor and user information with respect to the floor related state according to an example embodiment.

Referring to FIG. 3, the terminal UE may be a floor control terminal and may be in a floor permission state ('O: has permission') at a first step STEP_1. At this time, the terminal UE may transmit an RTP media packet to terminals in the same MCPTT group. The terminal UE may receive floor request messages transmitted from other terminals in the same MCPTT group using a ProSe Layer-2 group ID and a multicast address. However, this is merely an example, and example embodiments are not limited thereto. The terminal UE may receive the floor request messages in various ways.

The terminal UE may store user information on the terminal that transmitted the floor request message in a floor request queue Q_1 in the order of obtaining the floor. For example, each of second to fourth terminals may transmit the floor request message, and the terminal UE may sequentially store user information User 2 for the second terminal, user information User 3 for the third terminal, and user information User 4 for the fourth terminal in the floor request queue Q_1 in consideration of floor priority of group management information by considering a floor request message transfer order, etc, In a second step STEP_2, the terminal UE may be switched to a floor pending state ('O: pending granted') in order to transfer the floor to another terminal. The terminal UE may acquire and store the user information User 2 for the second terminal as floor candidate information C_Info_2 by using the floor request queue Q_1 of the first step STEP_1. Also, the terminal UE may delete the user information User 2 for the second terminal to update a floor request queue Q_2. The terminal UE may select the second terminal as a floor transfer target and transmit a floor grant message including the user information User 2 for the second terminal and the user information User 3 and User 4 stored in the floor request queue Q_2.

In a third step STEP_3a, when the terminal UE receives the RTP media packet within a predetermined time, the terminal UE may determine whether the RTP media packet is transmitted from the second terminal. When it is determined that the RTP media packet has been transmitted from the second terminal, the terminal UE may be switched to a floor no permission state ('O: has no permission'). In addition, the second terminal may be switched to the floor permission state ('O: has permission') in a predetermined state (for example, 'O: pending request'). The terminal UE may display the user information User 2 for the second terminal that has received the floor to the user of the terminal UE using floor candidate information C_Info_3a. Information stored in a floor request queue Q_3a of the terminal UE may be deleted in the 3a_th step STEP_3a and furthermore the floor candidate information C_Info_3a may be deleted after being displayed to the user of the terminal UE.

If the terminal UE does not receive the RTP media packet within the predetermined time in a 3b_th step STEP_3b, the terminal UE may select a third terminal having a next floor acquisition order as the floor transfer target and update a floor request queue Q_3b based on the third terminal. The terminal UE may acquire and store the user information User 3 for the third terminal as floor candidate information C_Info_3b. The terminal UE may transmit a floor grant message including the user information User 3 for the third terminal and the user information User 4 and User 2 stored in the floor request queue Q_3b.

In a fourth step STEP_4, when the terminal UE receives the RTP media packet within a predetermined time, the terminal UE may determine whether the RTP media packet has been transmitted from the third terminal. When it is determined that the RTP media packet has been transmitted from the third terminal, the terminal UE may be switched to the no floor permission state ('O: has no permission'). The terminal UE may display the user information User 3 for the third terminal that has received the floor to the user of the terminal UE using floor candidate information C_Info_4. Information stored in a floor request queue Q_4 of the terminal UE in the fourth step STEP_4 may be deleted, and furthermore the floor candidate information C_Info_4 may be deleted after being displayed to the user of the terminal UE.

Figure 4:
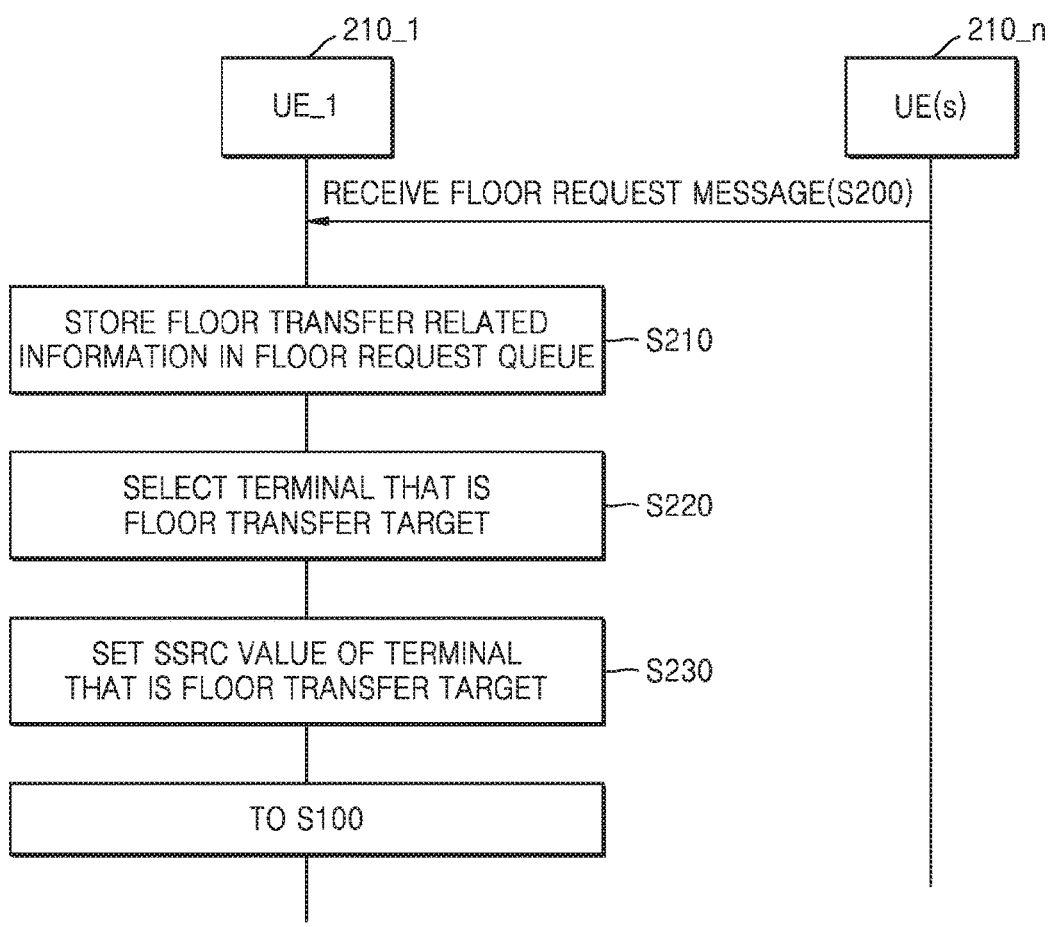
FIG. 4 is a flowchart illustrating an operation when a floor control terminal receives a floor request message according to an example embodiment.

FIG. 4 is a flowchart illustrating an operation when a floor control terminal receives a floor request message according to an example embodiment.

Referring to FIG. 4, the first terminal 210_1 may be a floor control terminal and may receive a floor request message transmitted from at least one of other terminals 210_n in the same MCPTT group as the first terminal 210_1 (S200). The first terminal 210_1 may store floor transfer related information in a floor request queue (S210). The floor transfer related information may include user information about a terminal that transmitted the floor request message. Furthermore, the first terminal 210_1 may store a synchronization source (SSRC) value of an SSRC field included in each floor request message. The first terminal 210_1 may select a terminal that is a floor transfer target in consideration of a floor acquisition priority (S220). For example, the first terminal 210_1 may select a terminal that first transmitted the floor request message as the terminal that is the floor transfer target from the terminals 210_n. The first terminal 210_1 may set and store an SSRC value of the terminal that is the floor transfer target (S230). The SSRC value of the terminal that is the floor transfer target may be obtained from the floor request message transmitted from the terminal that is the floor transfer target. Thereafter, step S100 of FIG. 3 may be performed.

Figure 5:
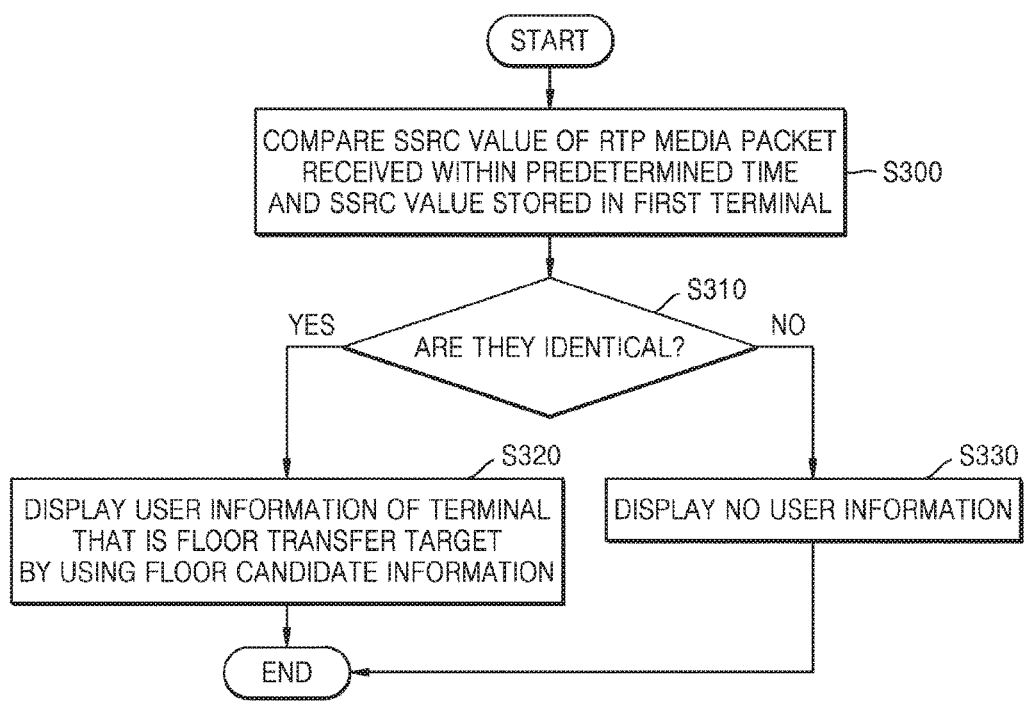
FIG. 5 is a flowchart for explaining an operation of determining whether an Real Time Transport Protocol (RTP) media packet received by a floor control terminal is transmitted from a terminal that is a floor transfer target according to an example embodiment.

FIG. 5 is a flowchart for explaining an operation of determining whether an RTP media packet received by a floor control terminal is transmitted from a terminal that is a floor transfer target according to an example embodiment.

Referring to FIG. 5, an SSRC value of an SSRC field of the RTP media packet received by a first terminal, which is the floor control terminal, within a predetermined time may be compared with an SSRC value of a floor transfer terminal stored in the first terminal (S300). When the SSRC value of the RTP media packet is identical to the SSRC value of a floor transfer terminal stored in the first terminal (S310, YES), the first terminal may use floor candidate information to display user information of a terminal that is a floor transfer target (S320). When the SSRC value of the RTP media packet is not identical to the SSRC value of a floor transfer terminal stored in the first terminal (S310, NO), the user information may not be displayed (S330).

Figure 6:
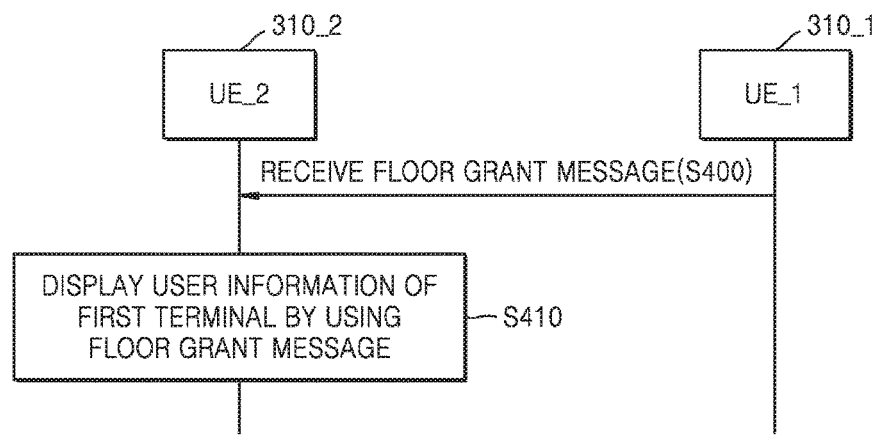
FIG. 6 is a flowchart illustrating a method of displaying user information for a terminal that has transferred a floor using a floor grant message according to an example embodiment.

FIG. 6 is a flowchart illustrating a method of displaying user information for a terminal that has transferred a floor using a floor grant message according to an example embodiment.

Referring to FIG. 6, a first terminal 310_1 may be a floor control terminal in a floor pending state ('O: pending granted'). The first terminal 310_1 may transmit the floor grant message to terminals in the same MCPTT group as the first terminal 310_1. The floor granting message may include user information for a terminal that has a floor up to now and controls the floor, and user information for a terminal that is a floor transfer target. For example, if the terminal that is the floor transfer target is a third terminal, the floor grant message may include user information on the first terminal 310_1 and user information on the third terminal.

A second terminal 310_2 may display the user information of the first terminal 310_1 that has the floor before the third terminal has the floor and controls the floor by using the floor grant message (S410).

Figure 7A:
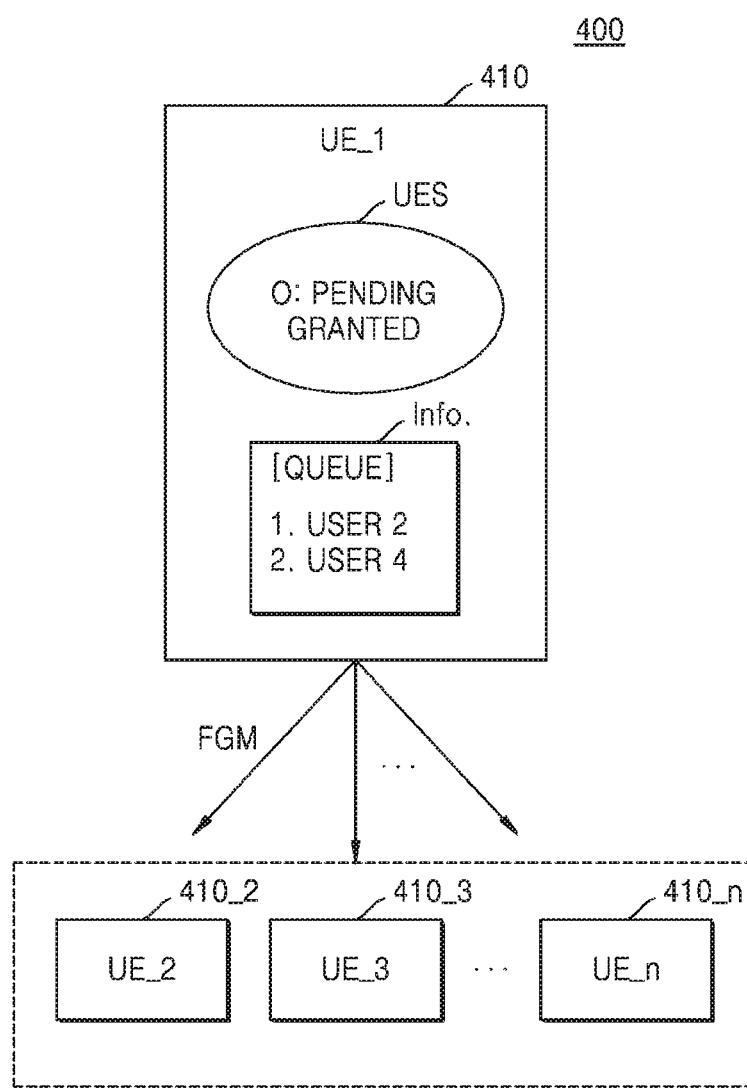
FIG. 7A is a block diagram illustrating a method of displaying user information for a terminal that has transferred a floor using a floor grant message according to an example embodiment.

FIG. 7A is a block diagram illustrating a method of displaying user information for a terminal that has transferred a floor using a floor grant message according to an example embodiment, and FIG. 7B is a diagram showing a format of a floor grant message according to an example embodiment.

Referring to FIG. 7A, an MCPTT group 400 may include a plurality of terminals 410_1 to 410_n. The first terminal 410_1 may be a floor control terminal and may have a floor pending state ('O: pending granted'). The user information User 2 for the second terminal 410_2 and the user information User 4 for the terminal 410_4 may be stored in a floor request queue Q. Also, it is assumed that the third terminal 410_3 is a floor transfer target terminal.

The first terminal 410_1 may transmit a floor grant message FGM to the second to nth terminals 410_2 to 410_n in the MCPTT group 400 by using a ProSe Layer-2 group ID and a multicast address allocated to the MCPTT group 400. In an example embodiment, the floor grant message FGM may include user information for the first terminal UE_1 that is a floor control terminal, user information for the third terminal UE_3 that is the floor transfer target terminal, and the user information User 2 and User 4 included in the floor request queue Q.

In an example embodiment, the second terminal 410_2 may receive the floor grant message FGM and may display user information for the first terminal UE_1 that is the floor control terminal and has talked up to now to a user of the second terminal 410_2 by using the floor grant message FGM. Also, the second terminal 410_2 may display user information for the third terminal 410_3 that is the floor transfer target terminal and acquired a floor from the first terminal UE_1 to the user of the second terminal 410_2 by using the floor grant message FGM.

Referring to FIG. 7B, the floor grant message FGM may include a field (V=2) defining a version by 2 bits, a field P defining whether a padding octet is included, a packet type field (PT=APP=204) defining an application packet of an RTP control protocol (RTCP), a subtype field (Subtype) defining the floor grant message FGM, an SSRC (synchronization) value (an SSRC of a floor control server) defining synchronization of a terminal transmitting the floor grant message FGM, e.g., the first terminal 410_1, and a length field defining a length of last data from the SSRC. In addition, the floor grant message FGM may further include a user ID field having a current floor and for the floor control terminal and a user ID field for a terminal that acquires the floor from the floor transfer target terminal, i.e., the floor control terminal. However, this is exemplary and example embodiments are not limited thereto. The floor grant message FGM may further include information fields necessary for performing an MCPTT service, and may further include an information field necessary for displaying user information for a terminal that acquires or has acquired the floor.

In this way, the MCPTT group 400 according to an example embodiment may show user information for a terminal that has talked up to now and user information for a terminal that has received the floor and starts talking through a user interface of each terminal, thereby increasing usability of the MCPTT service.

Figure 8:
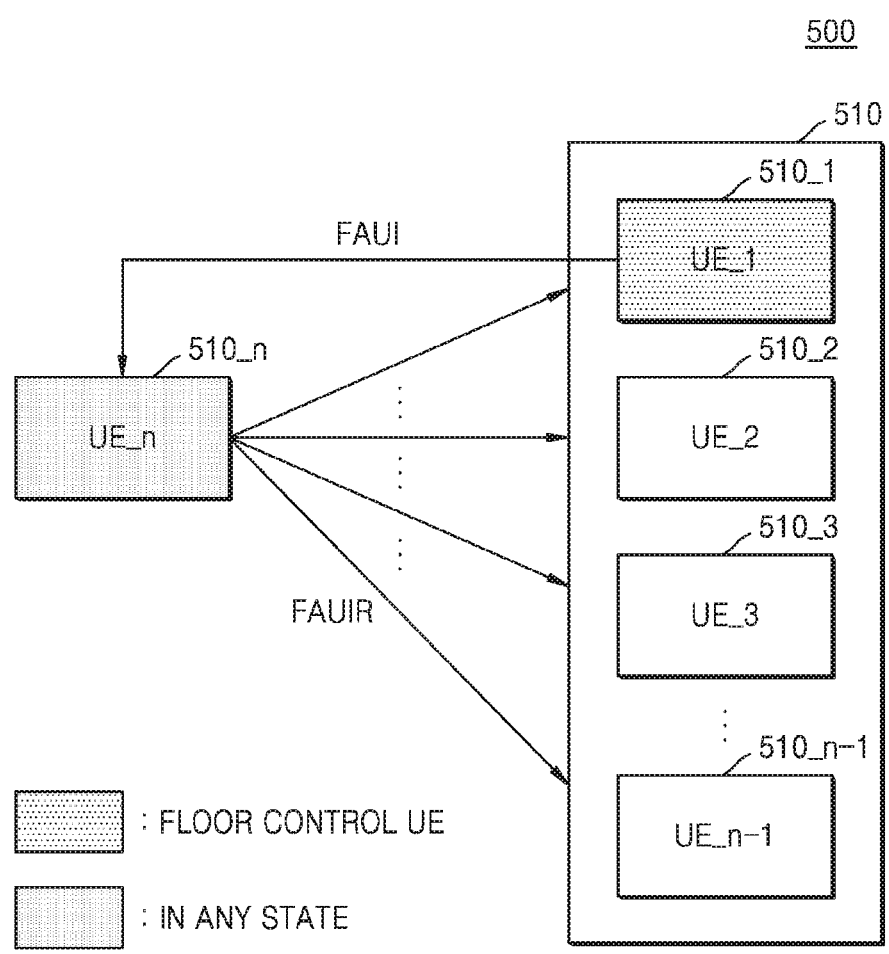
FIG. 8 is a block diagram illustrating a method of displaying user information for a current floor control terminal using a floor control message according to an example embodiment.

FIG. 8 is a block diagram illustrating a method of displaying user information for a current floor control terminal using a floor control message according to an example embodiment.

Referring to FIG. 8, an MCPTT group 500 may include a plurality of terminals 510_1 to 510_n. Hereinafter, the first terminal 510_1 may be a floor control UE. The nth terminal 510_n may transmit a floor arbitrator user ID request message FAUIR to the first to n-1th terminals 510_1 to 510_n-1 in the MCPTT group 500 by using a ProSe Layer-2 group ID and a multicast address assigned to the MCPTT group 500 in order to display user information of a terminal having a current floor to a user of the nth terminal 510_n. Floor arbiter information may be user information for a floor control terminal. The plurality of terminals 510_1 to 510_n in the MCPTT group 500 may transmit the floor arbitrator user ID request message FAUIR without limitation in any state in relation to a floor.

In an example embodiment, when the first terminal 510_1 receives the floor arbitrator user ID request message FAUIR in a floor permission state ('O: has permission') as the floor control terminal, the first terminal 510_1 may transmit a floor arbitrator user ID message FAUI including user information for the first terminal 510_1, i.e., a floor arbitrator user ID. Also, the first terminal 510_1 may maintain the previous floor permission state ('O: has permission') even after transmitting the floor arbitrator user ID message FAUI. FIG. 8 shows that the first terminal 510_1 directly transmits the floor arbitrator user ID message FAUI to the nth terminal 510_n for convenience of description, but the floor arbitrator user ID message FAUI may also be transmitted to the other terminals 510_2~510_n by using the ProSe Layer-2 group ID and the multicast address assigned to the MCPTT group 500, like another method of transmitting the floor control message.

In an example embodiment, the nth terminal 510_n may receive the floor arbitrator user ID message FAUI including the user information for the first terminal 510_1, and the nth terminal 510_n may display the user information for the first terminal 510_1 as the floor arbitrator user ID to a user of the nth terminal 510_n by using the floor arbitrator user ID message FAUI.

In this way, the MCPTT group 500 according to an example embodiment may request user information about a terminal having the current floor in utilizing an MCPTT service, may acquire the user information, and many display the user information through a user interface of each terminal, thereby increasing a usability of the MCPTT service.

FIG. 9A is a table showing a type of the floor arbitrator user ID request message FAUIR and a floor control message to which the floor arbitrator user ID message FAUI is added. FIG. 9B is a diagram showing a format of the floor arbitrator user ID request message FAUIR. FIG. 9C is a diagram showing a format of the floor arbitrator user ID message FAUI.

Referring to FIG. 9A, the floor arbitrator user ID request message FAUIR and the floor arbitrator user ID message FAUI according to an example embodiment may be included in a table indicating the type of the floor control message. As an example, the floor arbitrator user ID message FAUI may have a subtype field value of '01100', may be defined through a predetermined subclause 8.2.xx, and may be transmitted from a client having no floor to a server having a floor.

The floor arbitrator user ID message FAUI may also have a subtype field value of 'x1101', may be defined through a predetermined subclause 8.2.xx, and may be transmitted from the server having the floor to the client having no floor.

However, this is merely an example, and example embodiments are not limited thereto. The floor arbitrator user ID request message FAUIR and the floor arbitrator user ID message FAUI may have variously set formats.

Referring to the format for the floor arbitrator user ID request message FAUIR shown in FIG. 9B, the floor arbitrator user ID request message FAUIR may include a field (V=2) defining a version by 2 bits, a field P defining whether a padding octet is included, a packet type field (PT=APP=204) defining an application packet of the RTCP, a subtype field Subtype defining the floor arbitrator user ID request message FAUIR, a length field, an SSRC value (SSRC of a floor control server) defining synchronization of the floor control terminal, and an ID (name=MCPT) of a terminal that transmitted the floor arbitrator user ID request message FAUIR.

Referring to the format for the floor arbitrator user ID message FAUI of FIG. 9C, the floor arbitrator user ID message FAUI may include a field (V=2) defining a version by 2 bits, a field P defining whether a padding octet is included, a packet type field (PT=APP=204) defining an application packet of the RTCP, a subtype field Subtype defining the floor arbitrator user ID message FAUI, a length field, an SSRC value (SSRC of a floor control server) defining synchronization of the floor control terminal, an ID (name=MCPT) of a terminal transmitted the floor arbitrator user ID message FAUI, and a user ID field (or a floor arbitrator user ID field) of the floor control terminal.

Figure 10:
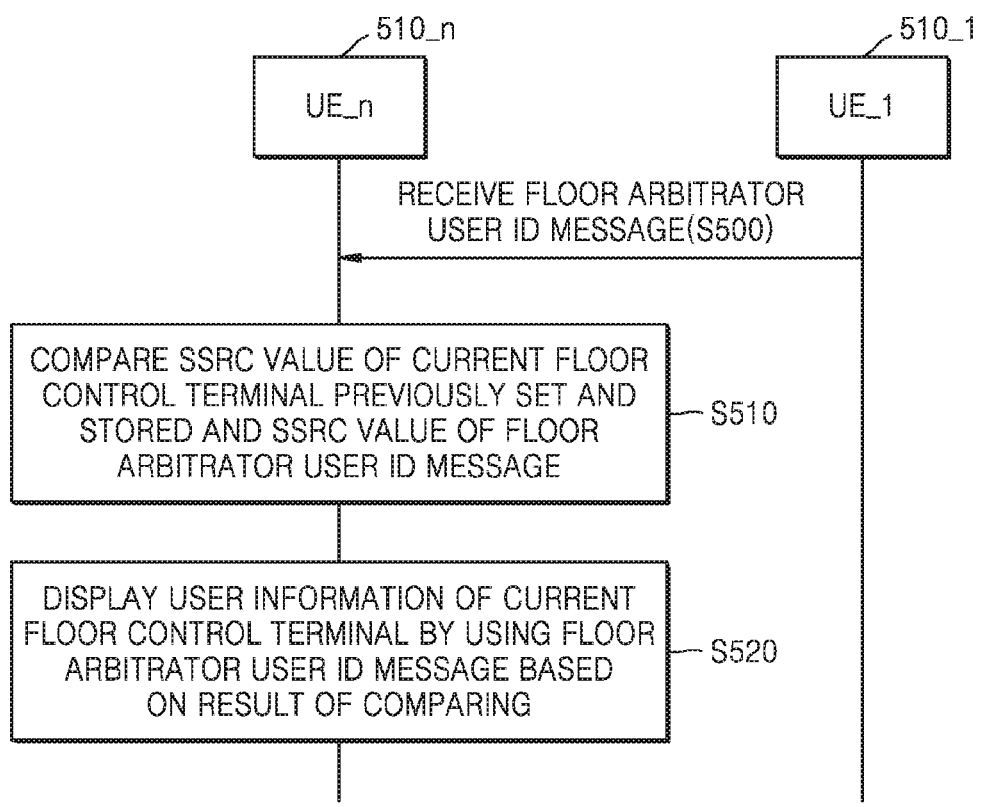
FIG. 10 is a flowchart illustrating an operation of displaying user information for a floor control terminal using a floor arbitrator user ID message according to an example embodiment.

FIG. 10 is a flowchart illustrating an operation of displaying user information for a floor control terminal using the floor arbitrator user ID message FAUI according to an example embodiment.

Referring to FIG. 10, the nth terminal 510_n may receive the floor arbitrator user ID message FAUI from the first terminal 510_1 that is a floor control terminal (S500). The nth terminal 510_n may compare an SSRC value of a floor control terminal previously set and stored in the nth terminal 510_n with an SSRC value of the floor arbitrator user ID message FAUI (S510). The SSRC value of the floor control terminal stored in the nth terminal 510_n may be a value obtained through a floor control message such as a previously received floor grant message. The nth terminal 510_n may display user information (for example, user information about the first terminal 510_1) to a current floor control terminal to a user of the nth terminal 510_n by using the floor arbitrator user ID message FAUI based on a result of comparison (S520). Specifically, when the SSRC value of the floor control terminal stored in the nth terminal 510_n is identical to the SSRC value of the floor arbitrator user ID message FAUI, the nth terminal 510_n may display the user information about the first terminal 510_1 included in the floor arbitrator user ID message FAUI to the user of the nth terminal 510_n. Thus, the user of the nth terminal 510_n may recognize the first terminal 510_1 is currently talking.

While aspects of example embodiments have been particularly shown and described, it will be understood that various changes in form and details may be made therein without departing from the spirit and scope of the following claims.

What is claimed is:

1. A method of displaying user information of a group comprising a plurality of terminals, the plurality of terminals comprising a first terminal managing a floor and a second terminal, the method comprising:

transmitting a floor grant message from the first terminal to the plurality of terminals, wherein the floor grant message indicates the second terminal as a transfer target of the floor;
acquiring a floor candidate information of the second terminal by using a floor request queue;
receiving a real-time transport protocol media packet within a predetermined time;
determining whether the real-time transport protocol media packet is from the second terminal; and
displaying second terminal user information by using the floor candidate information based on a result of the determining.

2. The method of displaying user information of claim 1, wherein the first terminal is in a floor pending state when the first terminal transmits the floor grant message.

3. The method of displaying user information of claim 1, wherein the floor request queue includes information indicating terminals among the plurality of terminals that have transmitted a floor request message.

4. The method of displaying user information of claim 1, wherein the determining of whether the real-time transport protocol media packet is transmitted from the second terminal comprises comparing a second terminal synchronization source value stored in the first terminal with a received synchronization source value of the real-time transport protocol media packet.

5. The method of displaying user information of claim 4, wherein the displaying of the second terminal user information comprises displaying the second terminal user information by using the floor candidate information when it is determined that the second terminal synchronization source value stored in the first terminal and the received synchronization source value of the real-time transport protocol media packet are identical.

6. The method of displaying user information of claim 1, wherein when the second terminal is transmitting the real-time transport protocol media packet, the first terminal is switched to a floor non-permissive state and the second terminal is switched to a floor permission state.

7. A method of displaying user information of a group comprising a first terminal managing a floor and a second terminal, the method comprising:
receiving, by the second terminal, a floor grant message comprising first terminal user information while the first terminal is in a floor pending state; and
displaying, by the second terminal, the first terminal user information based on the floor grant message receiving, by the first terminal, a real-time transport protocol media packet within a predetermined time; determining, by the first terminal whether the real-time transport protocol media packet is received from the third terminal; and displaying third terminal user information, by the first terminal, using floor candidate information obtained from a floor request queue based on a result of determining.

8. The method of displaying user information of claim 7, wherein the third terminal is a floor transfer target,
wherein the floor grant message further comprises the third terminal user information, and
wherein the method further comprises displaying, by the second terminal, the third terminal user information based on the floor grant message.

9. The method of displaying user information of claim 7, wherein the group further comprises a fourth terminal, and wherein the method of displaying user information further comprises transmitting, by the fourth terminal, a floor arbitrator user ID request message.

10. The method of displaying user information of claim 9, wherein the fourth terminal is able to transmit the floor arbitrator user ID request message in any state.

11. The method of displaying user information of claim 9, further comprising:
when the first terminal is in a floor permission state, receiving, by the first terminal, the floor arbitrator user ID request message; and
transmitting, by the first terminal, a floor arbitrator user ID message comprising the first terminal user information.

12. The method of displaying user information of claim 11, further comprising:
receiving, by the fourth terminal, the floor arbitrator user ID message; and
displaying, by the fourth terminal, the first terminal user information based on the floor arbitrator user ID message.

13. The method of displaying user information of claim 12, wherein the displaying of the user information of the first terminal comprises:
comparing, by the fourth terminal, a received synchronization source value of the floor arbitrator user ID message with a current floor control terminal synchronization source value stored in the fourth terminal; and
displaying, by the fourth terminal, the first terminal user information based on a result of the comparing.

14. The method of displaying user information of claim 11, wherein the first terminal maintains the floor permission state after receiving the floor arbitrator user ID request message.

15. A terminal configured to manage a floor and display user information of a group comprising a plurality of terminals the terminal comprising:
a display;
a communicator; and
a processor configured to cause the communicator to transmit a floor grant message to the plurality of terminals, the floor grant message indicating a target terminal among the plurality of terminals; acquire a floor candidate information of the target terminal from a floor request queue; determine whether a real-time transport protocol media packet received via the communicator is from the target terminal; and cause the display to display target terminal user information by using the floor candidate information based on the real-time transport protocol media packet being received from the target terminal within a predetermined time.

16. The terminal of claim 15, wherein the processor is further configured to manage the floor request queue based on floor request messages received from the plurality of terminals via the communicator.

17. The terminal of claim 15, wherein the processor is further configured to determine whether the real-time transport protocol media packet is transmitted from the target terminal comprises comparing a target terminal synchronization source value stored in the terminal with a received synchronization source value of the real-time transport protocol media packet.

18. The terminal of claim 17, wherein the processor is further configured to cause the display to display the target terminal user information by using the floor candidate information when it is determined that the target terminal synchronization source value stored in the terminal and the received synchronization source value of the real-time transport protocol media packet are identical.

19. The terminal of claim 17, wherein the processor is further configured to place the terminal in a no floor permission state when it is determined that the target terminal synchronization source value stored in the terminal and the received synchronization source value of the real-time transport protocol media packet are identical.

* * * * *